United States Patent
Mao et al.

(10) Patent No.: US 7,966,371 B2
(45) Date of Patent: *Jun. 21, 2011

(54) BROWSER BASED WEB CONFERENCING EMPLOYING LAYERING TO DISPLAY SCREEN UPDATES

(75) Inventors: Chengjiang Mao, San Jose, CA (US); Yanlin Guan, Santa Clara, CA (US); Lawrence Dorie, Los Altos, CA (US)

(73) Assignee: RHUB Communications, Inc, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/768,935

(22) Filed: Apr. 28, 2010

(65) Prior Publication Data

US 2010/0211823 A1  Aug. 19, 2010

Related U.S. Application Data

(63) Continuation of application No. 11/850,192, filed on Sep. 5, 2007.

(60) Provisional application No. 60/842,729, filed on Sep. 6, 2006.

(51) Int. Cl.
G06F 15/16 (2006.01)
G06F 3/00 (2006.01)

(52) U.S. Cl. ......... 709/204; 709/205; 709/206; 715/753

(58) Field of Classification Search .......... 709/204–207; 715/753
See application file for complete search history.

(56) References Cited

U.S. PATENT DOCUMENTS

| | | | |
|---|---|---|---|
| 6,766,356 B1 * | 7/2004 | Krautter | 709/204 |
| 6,973,623 B2 * | 12/2005 | Little et al. | 715/760 |
| 7,230,621 B2 * | 6/2007 | Adams, Jr. | 345/427 |
| 7,523,393 B2 * | 4/2009 | Joshi et al. | 715/234 |
| 2002/0156815 A1 * | 10/2002 | Davia | 707/517 |
| 2002/0194359 A1 * | 12/2002 | Little et al. | 709/233 |
| 2005/0055642 A1 * | 3/2005 | Chen et al. | 715/753 |
| 2007/0073730 A1 * | 3/2007 | Jun | 707/10 |

OTHER PUBLICATIONS

JVS@ANAESTHETIST.COM, "Layers in NN4.x", Nov. 11, 2000, http://www.anaesthetist.com/mnm/javascript/netlay.htm.*

* cited by examiner

*Primary Examiner* — Brendan Higa
(74) *Attorney, Agent, or Firm* — Howard H. Sheerin

(57) ABSTRACT

A browser based web conferencing method is disclosed, wherein a request to receive a screen update image of a first layer is transmitted over a network, and the screen update image of the first layer is displayed. A request to receive a screen update image of a second layer is transmitted over the network, and the screen update image of the second layer is displayed, wherein the screen update image of the second layer overlaps the screen update image of the first layer. An image-load script is executed in connection with receiving one of the screen update images, wherein the image-load script executes the request-update script after all of the screen update images of the first layer have been displayed.

9 Claims, 23 Drawing Sheets

```
<div id="232" style="z-index: 232;">

<img onload="ImageLoaded('232')"
     src="/request_img?mid=293902&uid=2&did=232&iid=0"
     style="border: 0px none ; margin: 0px; padding: 0px; position: absolute;
     left: 465px; top: 621px; width: 256px; height: 256px;
     -moz-user-select: none; z-index: 232;">

<img onload="ImageLoaded('232')"
     src="/request_img?mid=293902&uid=2&did=232&iid=1"
     style="border: 0px none ; margin: 0px; padding: 0px; position: absolute;
     left: 65px; top: 21px; width: 56px; height: 56px;
     -moz-user-select: none; z-index: 232;">

<img onload="ImageLoaded('232')"
     src="/request_img?mid=293902&uid=2&did=232&iid=2"
     style="border: 0px none ; margin: 0px; padding: 0px; position: absolute;
     left: 165px; top: 121px; width: 156px; height: 156px;
     -moz-user-select: none; z-index: 232;">

</div>
```

FIG. 1B

```
// **************** CLIENT (BROWSER) SIDE CODE **************** //
<html>
<head>
<LINK href="/as/style/general.css" type="text/css" rel="stylesheet">
<meta http-equiv="Content-Type" content="text/html; charset=windows-1252">
<meta name="GENERATOR" content="Microsoft FrontPage 4.0">
<meta name="ProgId" content="FrontPage.Editor.Document">
<title>TurboMeeting</title>
</head>

<SCRIPT language="JavaScript"> var oXmlHttp;
var gRequestIndex = {};
var sUrl;
var gDeltaID = 0;
var gTimeout = 25000;
var gUpdatedInTimeout = 0;
var gCounter = 0;

function RquestUpdate(iDeltaId, iRequestByTimeout)
{
        oXmlHttp = GetXmlHttpObject();
        if (oXmlHttp == null)
        {
                alert("You need to upgrade your browser or use a different browser");
                return;
        } gDeltaID = iDeltaId;
        gUpdatedInTimeout = 1;
        gCounter++;
        sUrl = "/deltareq";
        sUrl = sUrl + "?" + "&did=" + iDeltaId + "&count=" + gCounter;

if (iRequestByTimeout == 1)
        {
                sUrl = sUrl + "&timeout=Y";
        }
        else
        {
                sUrl = sUrl + "&timeout=N";
        } oXmlHttp.onreadystatechange = StateChanged;
        oXmlHttp.open("GET", sUrl, true);
        oXmlHttp.send(null);
}
```

FIG. 11A

```
function StateChanged()
{
    if (oXmlHttp.readyState == 4 || oXmlHttp.readyState == "complete")
    {
        if (oXmlHttp.status == 200)
        {
            // Brower executes the JavaScript from the server. See the server side code.
            eval(oXmlHttp.responseText);
        }
    }
} function GetXmlHttpObject()
{
    var oXmlHttpObject = null;

if (window.XMLHttpRequest)
    {
        oXmlHttpObject = new XMLHttpRequest();
    }
    else if (window.ActiveXObject)
    {
        oXmlHttpObject = new ActiveXObject("Microsoft.XMLHTTP");
    } return oXmlHttpObject;
} function ImageLoad(iReceivedDeltaId)
{
    if (gRequestIndex[iReceivedDeltaId] != null)
    {
        gUpdatedInTimeout = 1;
        var iTemp = gRequestIndex[iReceivedDeltaId];
        iTemp = iTemp -1;

gRequestIndex[iReceivedDeltaId] = iTemp;

if (iTemp == 0)
        {
            gRequestIndex[iReceivedDeltaId] = null;
            RquestUpdate(iReceivedDeltaId, 0);
        }
    }
}
```

FIG. 11B

```
function Start()
{
        if (gUpdatedInTimeout == 0)
        {
                RquestUpdate(gDeltaID, 1);
        } gUpdatedInTimeout = 0 setTimeout("Start()", gTimeout);
}

</SCRIPT>

<body onLoad="Start()">
<div id="Delta">
</div>
</body>

</html>
```

FIG. 11C

```
// **************** SERVER SIDE CODE **************** //

// oXmlHttp.responseText inside client "eval(oXmlHttp.responseText)" is the JavaScript returned
from the server // Below is the server code generating the JavaScript string sDelta = "<div>";
    string sOutput = "";

for (int i = 0; i < uVDelta->m_uDelta.m_hNumberOfImage; i++)
    {
// the image name includes the meeting ID (mid), Dela id (did), and image id (iid) in the delta sDelta = sDelta + "<img onload=ImageLoad('" + IntToString(uVDelta->m_iVDeltaId) + "') 
src='" + WAPI_VIEWER_ONLY_IMAGE_REQUEST + "?mid=" +
IntToString(uVAttendeeRequest->m_iMeetingId) + "&uid=" +
IntToString((int)uVAttendeeRequest->m_hUserId) + "&did=" + IntToString(uVDelta->m_iVDeltaId) +
"&iid=" + IntToString(i) + "' ";

sDelta = sDelta + "style='border: 0px none ; margin: 0px; padding: 0px; position: absolute; 
left: " + IntToString(uVDelta->m_uDelta.m_aImage[i].m_hOriginX) + "px; top: " +
IntToString(uVDelta->m_uDelta.m_aImage[i].m_hOriginY) + "px; width: " +
IntToString(uVDelta->m_uDelta.m_uDelta.m_aImage[i].m_hWidth) + "px; height: " +
IntToString(uVDelta->m_uDelta.m_aImage[i].m_hHeight) + "px; -moz-user-select: none; z-index: " +
IntToString(uVDelta->m_iVDeltaId) + ";'>";
    } sDelta += "</div>";
    string sRequest = "";
    sRequest += "gDeltaID = " + IntToString(uVDelta->m_iVDeltaId) + ";\n";
    sRequest += "gRequestIndex[\"" + IntToString(uVDelta->m_iVDeltaId) + "\"] =
    " + IntToString(uVDelta->m_uDelta.m_hNumberOfImage) + ";\n";

// If the current delta is a still, flush the client side JavaScrip code displaying previous deltas
    if (uVDelta->m_uDelta.m_bIsStill)
        sOutput = sRequest + "document.getElementById(\"Delta\").innerHTML = \"" + sDelta + "\";";
    else
        sOutput = sRequest + "document.getElementById(\"Delta\").innerHTML = \"" + sDelta + "\" +
document.getElementById(\"Delta\").innerHTML;";

// write back to browser now
    oResponse->Write(sOutput, HTTP_OK);
```

FIG. 11D

```
// ***************** CLIENT (BROWSER) SIDE CODE ***************** //
<html>
<head>
<LINK href="/as/style/general.css" type="text/css" rel="stylesheet">
<meta http-equiv="Content-Type" content="text/html; charset=windows-1252">
<meta name="GENERATOR" content="Microsoft FrontPage 4.0">
<meta name="ProgId" content="FrontPage.Editor.Document">
<title>TurboMeeting</title>
</head>

<SCRIPT language="JavaScript"> var gDiv = null;
var gDivIndex = 0;
var gMaxDiv = 205;         // adjustable number
var oXmlHttp;
var gRequestIndex = {};
var sUrl;
var gDeltaID = 0;
var gTimeout = 25000;
var gUpdatedInTimeout = 0;
var gCounter = 0;

function RquestUpdate(iDeltaId, iRequestByTimeout)
{
        oXmlHttp = GetXmlHttpObject();
        if (oXmlHttp == null)
        {
                alert("You need to upgrade your browser or use a different browser");
                return;
        } gDeltaID = iDeltaId;
        gUpdatedInTimeout = 1;
        gCounter++;
        sUrl = "/deltareq";
        sUrl = sUrl + "?" + "&did=" + iDeltaId + "&count=" + gCounter;

if (iRequestByTimeout == 1)
        {
                sUrl = sUrl + "&timeout=Y";
        }
        else
        {
                sUrl = sUrl + "&timeout=N";
        } oXmlHttp.onreadystatechange = StateChanged;
        oXmlHttp.open("GET", sUrl, true);
        oXmlHttp.send(null);
}
```

FIG. 12A

```
function StateChanged()
{
    if (oXmlHttp.readyState == 4 || oXmlHttp.readyState == "complete")
    {
        if (oXmlHttp.status == 200)
        {
            // Brower executes the JavaScript from the server. See the server side code.
            eval(oXmlHttp.responseText);
        }
    }
} function GetXmlHttpObject()
{
    var oXmlHttpObject = null;

if (window.XMLHttpRequest)
    {
        oXmlHttpObject = new XMLHttpRequest();
    }
    else if (window.ActiveXObject)
    {
        oXmlHttpObject = new ActiveXObject("Microsoft.XMLHTTP");
    } return oXmlHttpObject;
} function ImageLoad(iReceivedDeltaId)
{
    if (gRequestIndex[iReceivedDeltaId] != null)
    {
        gUpdatedInTimeout = 1;
        var iTemp = gRequestIndex[iReceivedDeltaId];
        iTemp = iTemp -1;

gRequestIndex[iReceivedDeltaId] = iTemp;

if (iTemp == 0)
        {
            gRequestIndex[iReceivedDeltaId] = null;
            RquestUpdate(iReceivedDeltaId, 0);
        }
    }
}
```

FIG. 12B

```
function Start()
{
    if (gUpdatedInTimeout == 0)
    {
        RquestUpdate(gDeltaID, 1);
    } gUpdatedInTimeout = 0 setTimeout("Start()", gTimeout);
}
</SCRIPT>

<body onLoad="Start()">
<div id="Delta">
</div>

<script type="JavaScript"> var oDeltaDiv = document.getElementById("Delta");

// Pre-allocate div elements and place them above the "Delta" Div gDiv = new Array(gMaxDiv);
    for(var i=0; i < gMaxDiv; i=i+1)
    {
        gDiv[i] = document.createElement("div");
        document.body.insertBefore(gDiv[i], oDeltaDiv);
    }

</script>

</body>

</html>
```

FIG. 12C

```
// **************** SERVER SIDE CODE **************** //

// oXmlHttp.responseText inside client "eval(oXmlHttp.responseText)" is the JavaScript returned
from the server // Below is the server code generating the JavaScript string sDelta = "<div>";
    string sOutput = "";

for (int i = 0; i < uVDelta->m_uDelta.m_hNumberOfImage; i++)
    {
// the image name includes the meeting ID (mid), Dela id (did), and image id (iid) in the delta sDelta = sDelta + "<img onload=ImageLoad('" + IntToString(uVDelta->m_iVDeltaId) + "')
src='" + WAPI_VIEWER_ONLY_IMAGE_REQUEST + "?mid=" +
IntToString(uVAttendeeRequest->m_iMeetingId) + "&uid=" +
IntToString((int)uVAttendeeRequest->m_hUserId) + "&did=" + IntToString(uVDelta->m_iVDeltaId) +
"&iid=" + IntToString(i) + "' ";

sDelta = sDelta + "style='border: 0px none ; margin: 0px; padding: 0px; position: absolute;
left: " + IntToString(uVDelta->m_uDelta.m_aImage[i].m_hOriginX) + "px; top: " +
IntToString(uVDelta->m_uDelta.m_aImage[i].m_hOriginY) + "px; width: " +
IntToString(uVDelta->m_uDelta.m_aImage[i].m_hWidth) + "px; height: " +
IntToString(uVDelta->m_uDelta.m_aImage[i].m_hHeight) + "px; -moz-user-select: none; z-index: " +
IntToString(uVDelta->m_iVDeltaId) + ";'>";
    } sDelta += "</div>";
    string sRequest = "";
    sRequest += "gDeltaID = " + IntToString(uVDelta->m_iVDeltaId) + ";\n";
    sRequest += "gRequestIndex[\"" + IntToString(uVDelta->m_iVDeltaId) + "\"] =
    " + IntToString(uVDelta->m_uDelta.m_hNumberOfImage) + ";\n";

// Fill a delta to the current Div identify by gDivIndex sOutput = sRequest + "gDiv[gDivIndex].innerHTML = \"" + sDelta + "\"";

// Increase gDivIndex by one and rotate to use the pre-allocated Div.
// This will overwrite old images displayed on the browser by the new
// deltas. In order to make the overwriting correct, the max number of
// deltas between "still" delta must be less than gMaxDiv gDivIndex = (gDivIndex + 1) % gMaxDiv\;";

// write back to browser now
    oResponse->Write(sOutput, HTTP_OK);
```

FIG. 12D

BROWSER BASED WEB CONFERENCING EMPLOYING LAYERING TO DISPLAY SCREEN UPDATES

CROSS-REFERENCE TO RELATED APPLICATIONS

This application is a continuation of U.S. patent application Ser. No. 11/850,192 filed on Sep. 5, 2007.

This application claims priority from Provisional Application Ser. No. 60/842,729 filed Sep. 6, 2006.

BACKGROUND

1. Field

The present invention relates to web conferencing, and in particular, browser based web conferencing employing layering to display screen updates.

2. Description of the Related Art

Web conferencing can be implemented by screen sharing a presenter's screen with attendees over the Internet. Various techniques have been disclosed to implement the screen sharing aspect, such as with a plug-in (e.g., Flash) that augments the basic operation of a web browser (e.g., Internet Explorer, Safari, Firefox, etc.). However, if the plug-in is not pre-installed on an attendee's computer, an attendee typically must download and install the plug-in before joining a meeting. Downloading a plug-in increases the setup time and complexity for an attendee to join a meeting. In addition, the attendee's computer (or gateway server) may have firewall software installed that may inhibit or further complicate the download and installation of the plug-in. Yet another problem is that an attendee may be hesitant to download and install a plug-in for fear of downloading a virus.

An alternative technique employs the basic functionality of a browser to implement screen sharing (browser based web conferencing) which obviates the need to download a plug-in. Thus, any attendee with an appropriate browser installed can join a meeting by simply launching the browser and visiting the designated web site. However, several drawbacks have been identified with browser based web conferencing, such as the comparatively slow response time to transmit screen updates from the presenter to the attendees.

SUMMARY OF THE EMBODIMENTS OF THE INVENTION

An embodiment of the present invention comprises a browser based web conferencing method, wherein Hypertext Markup Language (HTML) code is transmitted to a browser of an attendee computer. A first screen update request is transmitted over a network, and HTML code is received identifying a screen update image of a first layer. A request to receive the screen update image of the first layer is transmitted over the network, and the screen update image of the first layer is displayed. A second screen update request is transmitted over a network, and HTML code is received identifying a screen update image of a second layer. A request to receive the screen update image of the second layer is transmitted over the network, and the screen update image of the second layer is displayed, wherein the screen update image of the second layer overlaps at least part of the screen update image of the first layer.

In one embodiment, the HTML code comprises an img HTML tag.

In another embodiment, the HTML code identifying the screen update image of the first layer comprises a first z-index HTML tag and the HTML code identifying the screen update image of the second layer comprises a second z-index HTML tag.

In one embodiment, the first update image of the first layer represents a substantially full screen update, and the second update image of the second layer represents a partial screen update.

In yet another embodiment, the HTML code of the first layer is stored in an HTML element, and the HTML code of the second layer is appended to the HTML element. In one embodiment, the HTML code is deleted from the HTML element when a full screen update image is received.

In still another embodiment, transmission of the screen update request comprises a request-update script. In one embodiment, the HTML code of the first layer comprises HTML code identifying a plurality of screen update images of the first layer, and an image-load script is executed in connection with displaying one of the screen update images, wherein the image-load script executes the request-update script after all of the screen update images of the first layer have been displayed.

In another embodiment, when a communication error is detected, a request for a full screen update image is transmitted.

Another embodiment of the present invention comprises a browser based web conferencing system comprising a server computer, a presenter computer, and an attendee computer. The server computer receives screen update images from the presenter computer and transmits the screen update images to the attendee computer. The attendee computer transmits to the server computer a first screen update request, and receives from the server computer HTML code identifying a screen update image of a first layer. The attendee computer transmits a request to the server computer to receive the screen update image of the first layer, and displays the screen update image of the first layer. The attendee computer transmits a second screen update request to the server computer, and receives from the server computer HTML code identifying a screen update image of a second layer. The attendee computer transmits a request to the server computer to receive the screen update image of the second layer, and displays the screen update image of the second layer, wherein the screen update image of the second layer overlaps at least part of the screen update image of the first layer.

BRIEF DESCRIPTION OF THE DRAWINGS

FIG. 1B is example HTML code used to display images in layers according to an embodiment of the present invention.

FIGS. 11A-11C is source code executed by the browser at each attendee computer according to an embodiment of the present invention.

FIG. 11D is source code executed by the server computer according to an embodiment of the present invention.

FIGS. 12A-12C is source code executed by the browser at each attendee computer according to an alternative embodiment of the present invention.

FIG. 12D is source code executed by the server computer according to an alternative embodiment of the present invention.

DETAILED DESCRIPTION OF EMBODIMENTS OF THE INVENTION

Figure 1A:
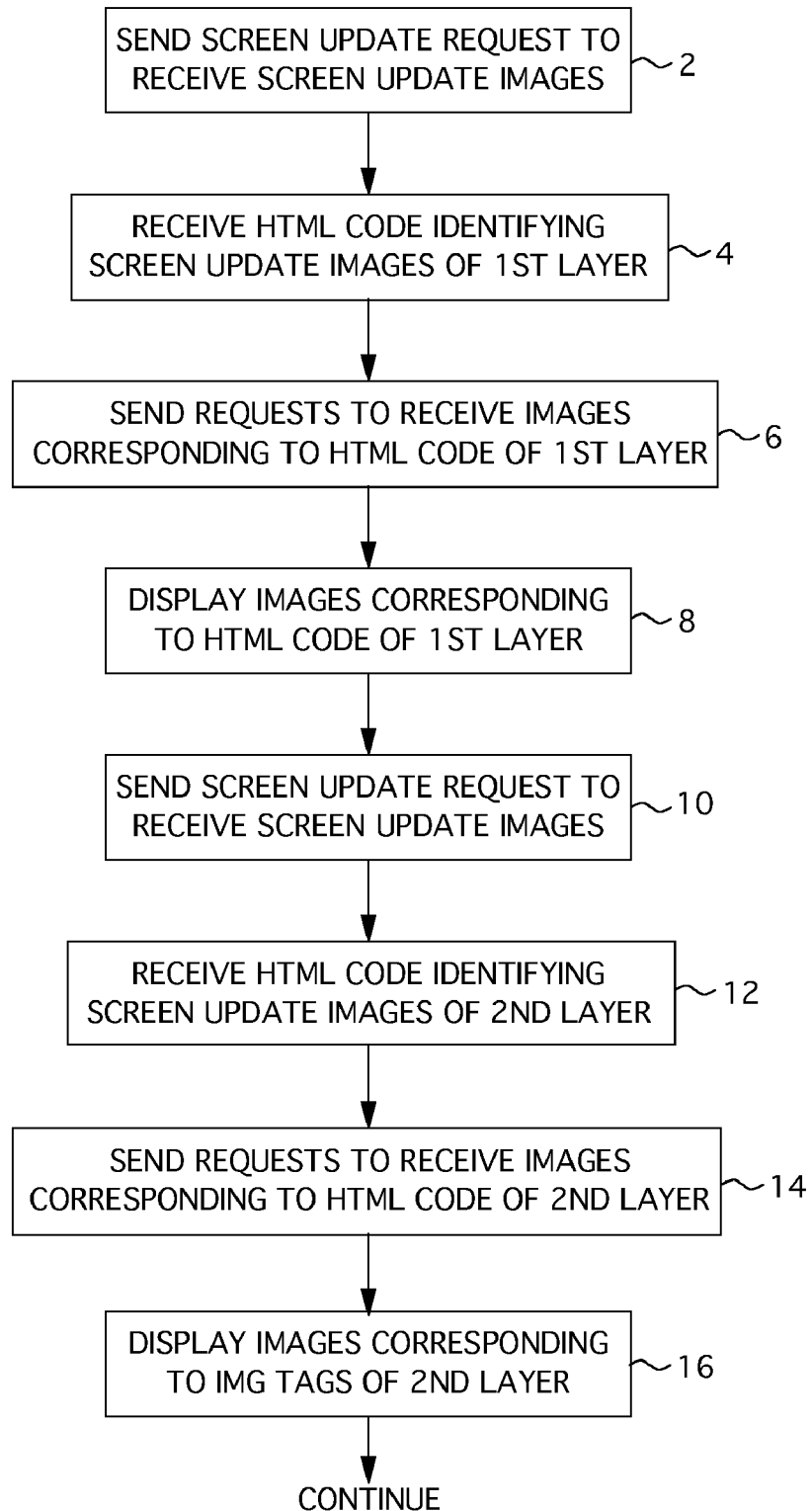
FIG. 1A is a flow diagram according to an embodiment of the present invention for implementing browser based web conferencing using layers.

FIG. 1A is a flow diagram according to an embodiment of the present invention for a browser based web conferencing system, wherein Hypertext Markup Language (HTML) code is transmitted to a browser of an attendee computer. A first screen update request is transmitted over a network (step 2), and HTML code is received identifying a screen update image of a first layer (step 4). A request to receive the screen update image of the first layer is transmitted over the network (step 6), and the screen update image of the first layer is displayed (step 8). A second screen update request is transmitted over a network (step 10), and HTML code is received identifying a screen update image of a second layer (step 12). A request to receive the screen update image of the second layer is transmitted over the network (step 14), and the screen update image of the second layer is displayed (step 16), wherein the screen update image of the second layer overlaps at least part of the screen update image of the first layer.

FIG. 1B shows example HTML code for identifying a screen update image according to an embodiment of the present invention. The HTML code shown in FIG. 1B is received in response to a single update request, for example, an update request for the No. 232 layer. Three screen update images are identified by the HTML code using three HTML image tags (img with image iid=0, iid=1, iid=2). Each screen update image is identified by a source tag (src) followed by an image request URL:

"/request_img?mid=293902&uid=2&did=232&iid=0",
"/request_img?mid=293902&uid=2&did=232&iid=1",
"/request_img?mid=293902&uid=2&did=232&iid=2".

The first parameter (mid) in the URL identifies the web meeting, the next parameter (uid) identifies an attendee, the next parameter (did) identifies the layer, and the last parameter (iid) (0, 1, and 2) identifies the respective image files (.gif format in the example, which can be any other image format such as .jpeg). The screen update images are displayed according to suitable style parameters as identified by an HTML style tag (style), including a z-index id parameter (232 in the example) that identifies the layer for displaying the screen update images. In one embodiment, the browser displays the images of each layer in an ascending order corresponding to the z-index (the images of layer 1 are displayed, then the images of layer 2, etc.). Displaying the images in layers enables the images of higher layers to overlap images of lower layers as described in more detail below.

Figure 2:
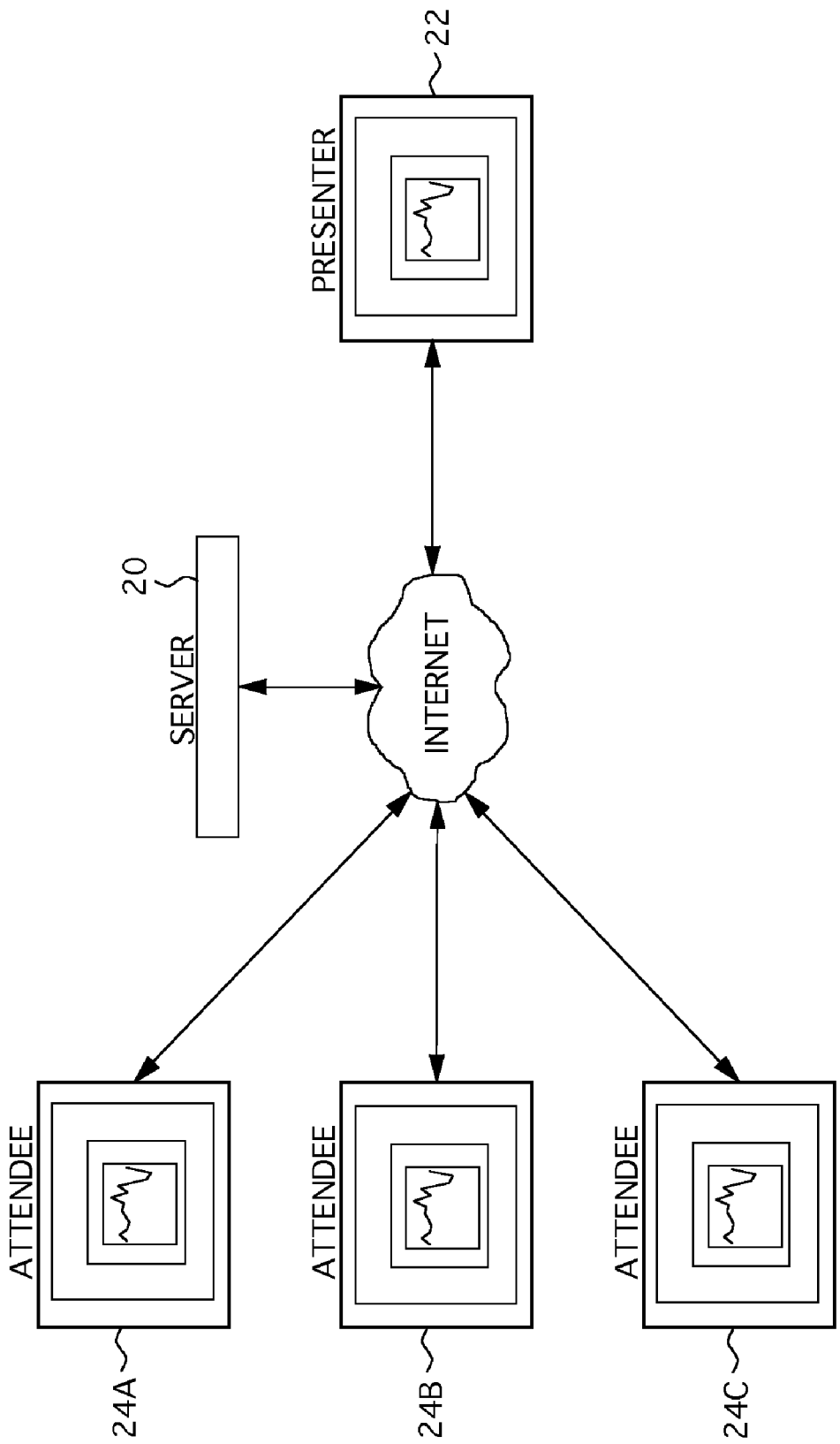
FIG. 2 shows a browser based web conferencing system according to an embodiment of the present invention comprising a presenter computer, a server computer, and a plurality of attendee computers.

The update requests may be transmitted over the network to any suitable computer, such as the computer that is displaying the original presentation (the presenter computer). In an alternative embodiment shown in FIG. 2, a server computer 20 acts as an intermediary between a presenter computer 22 and the attendee computers 24A-24C. Also in the embodiment of FIG. 2, the server computer 20 communicates with the presenter computer 22 and the attendee computers 24A-24C over the Internet using a suitable communication protocol. An attendee computer (e.g., 24A) sends a update to the Server computer 20. The server determines whether there is a new image to send back to the attendee computer. If not, the server sends a request to the presenter computer 22. The server receives a screen a update image from the presenter computer and sends the image to the attendee computer (24A) that makes the initial update request. Meanwhile, the server buffers the received images from the presenter computer in order to respond to later update requests from other attendees (24B, 24C). In one embodiment, each attendee computer 24A-24C communicates over a different connection having a different data rate, and therefore the attendee computers 24A-24C may be out of sync with respect to the screen update images (i.e., some of the attendee computers may be slower than others in receiving the screen update images). In an embodiment disclosed in more detail below, the server computer 20 may periodically transmit a full screen update image to all of the attendee computers 24A-24C in order to resynchronize all of the attendee computers 24A-24C.

Figure 3:
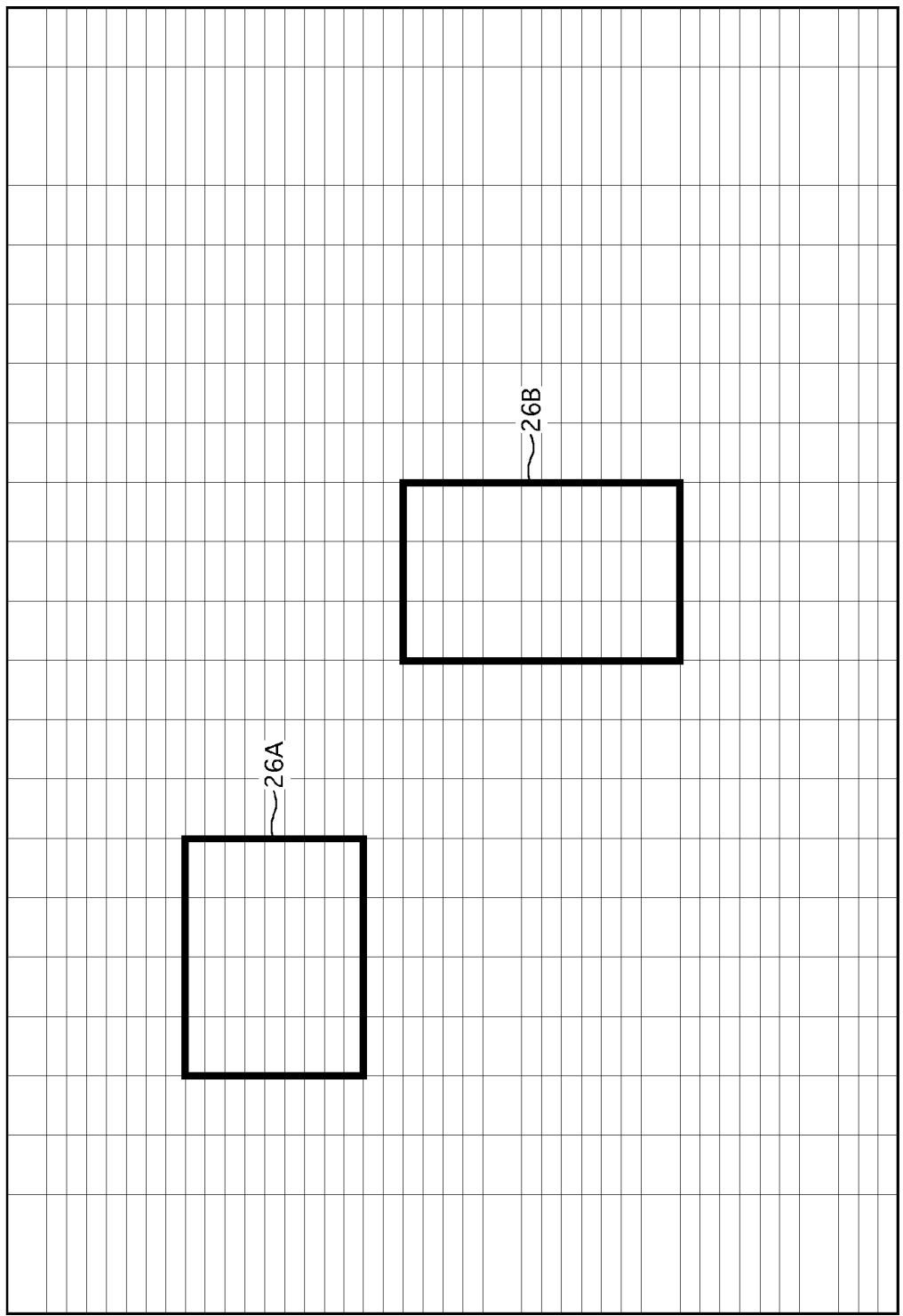
FIG. 3 shows an embodiment of the present invention wherein the screen is divided into a grid of blocks which are then aggregated into a macro block representing a screen update image.

FIG. 3 shows an embodiment wherein the screen of the presenter computer 22 is represented as a grid of blocks which are aggregated to form a macro block (e.g., macro block 26A) representing a screen update image. A full screen update image is generated by forming a macro block comprising all of the blocks of the screen. Thus, in one embodiment a full screen update image is generated first (corresponding to the first layer) and transmitted to the attendee computers 24A-24C. Then when the presenter's screen changes (e.g., as shown by macro blocks 26A and 26B), only the screen update images forming a delta are transmitted to the attendee computers 24A-24C that display the delta in the next layer.

Figure 4A:
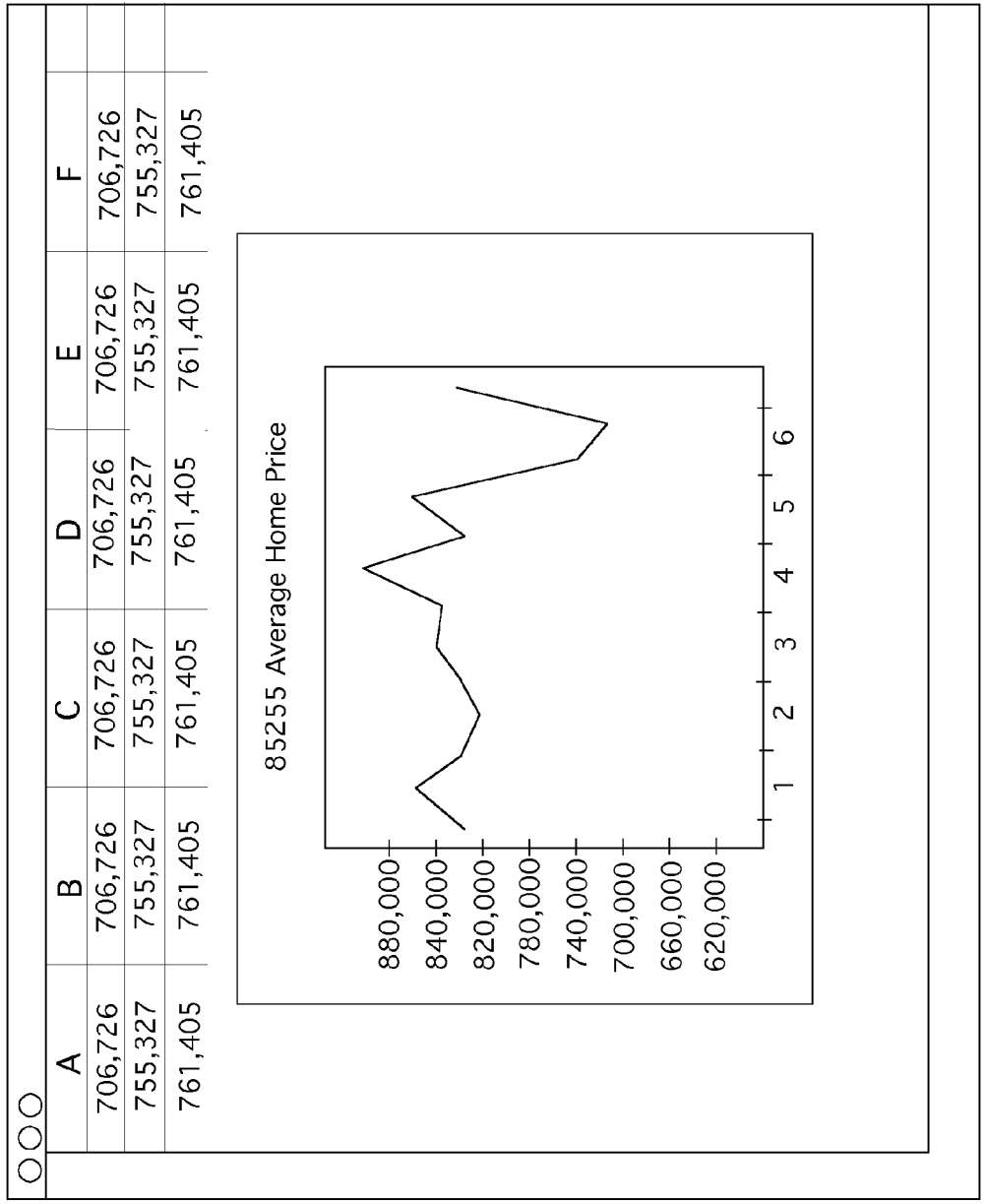
FIG. 4A is an example full screen update image transmitted to the attendees.
Figure 4B:
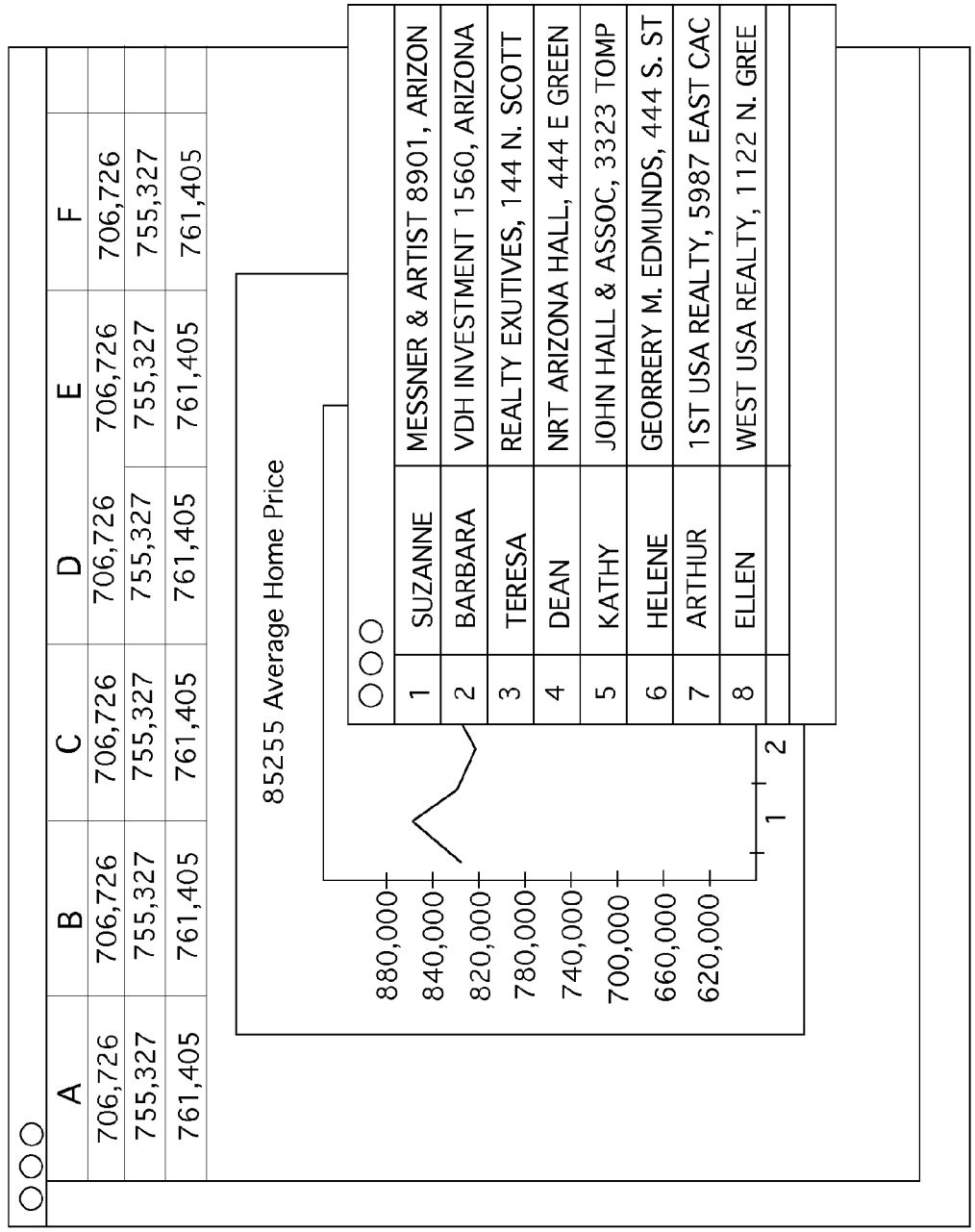
FIG. 4B is an example screen update when a new window is opened.

FIGS. 4A-4B further illustrate an embodiment of the present invention, wherein the presenter's screen initially comprises a spread sheet document as shown in FIG. 4A and wherein a corresponding initial full screen update image is generated and transmitted to the attendee computers 24A-24C. FIG. 4B shows that the presenter's screen changes by opening a new window, wherein a corresponding screen update image is generated and transmitted to the attendee computers 24A-24C for display in a new layer. Note that the screen update image representing the newly opened window overlaps the previous full screen update image. Thus, when the browser of the attendee computers displays the update, it first displays the initial full screen update image in a first layer, and then displays the screen update image corresponding to the newly opened window in a second layer that overlaps the first layer.

Figure 4C:
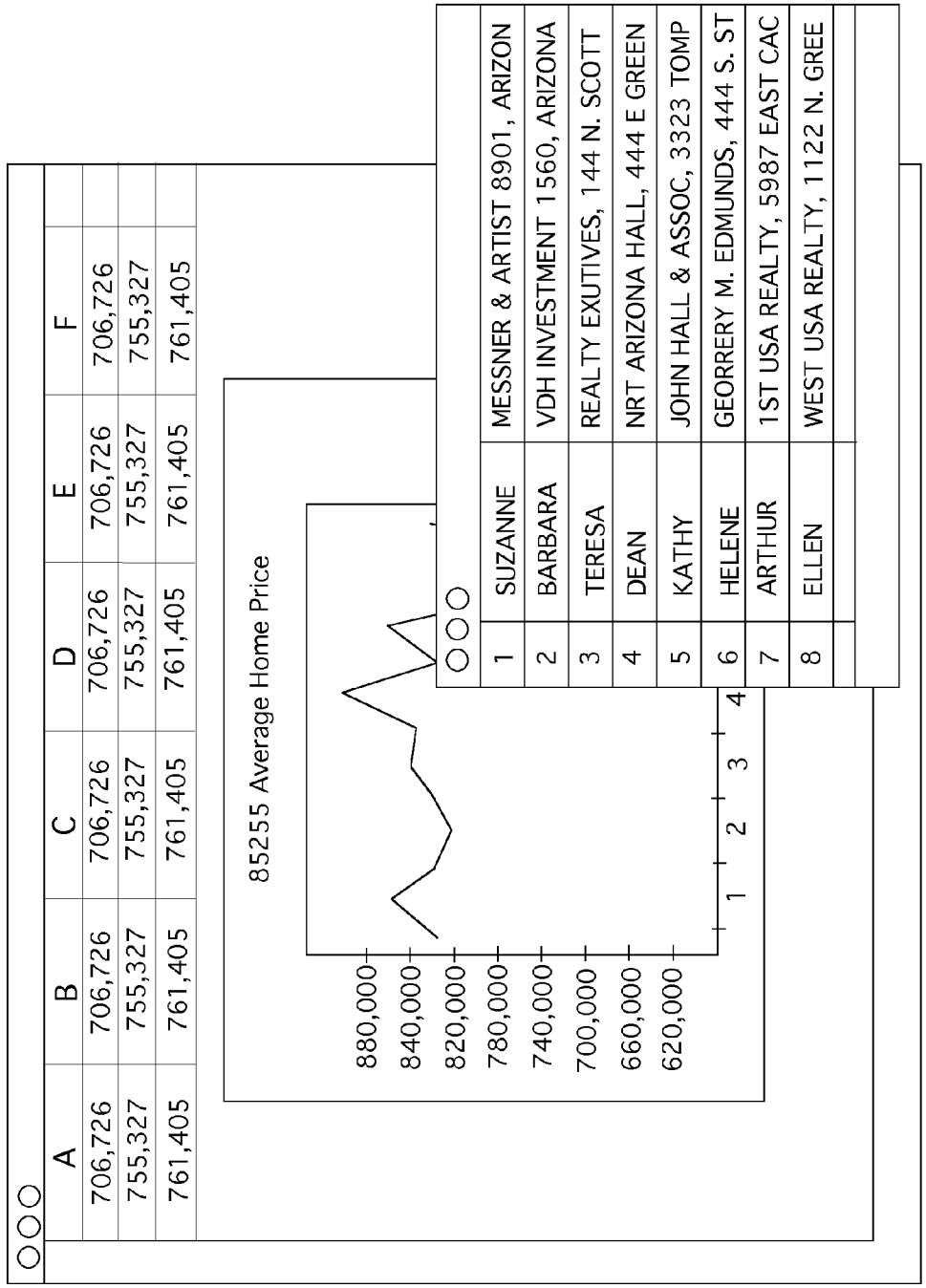
FIG. 4C is another example screen update when the new window is moved.
Figure 4D:
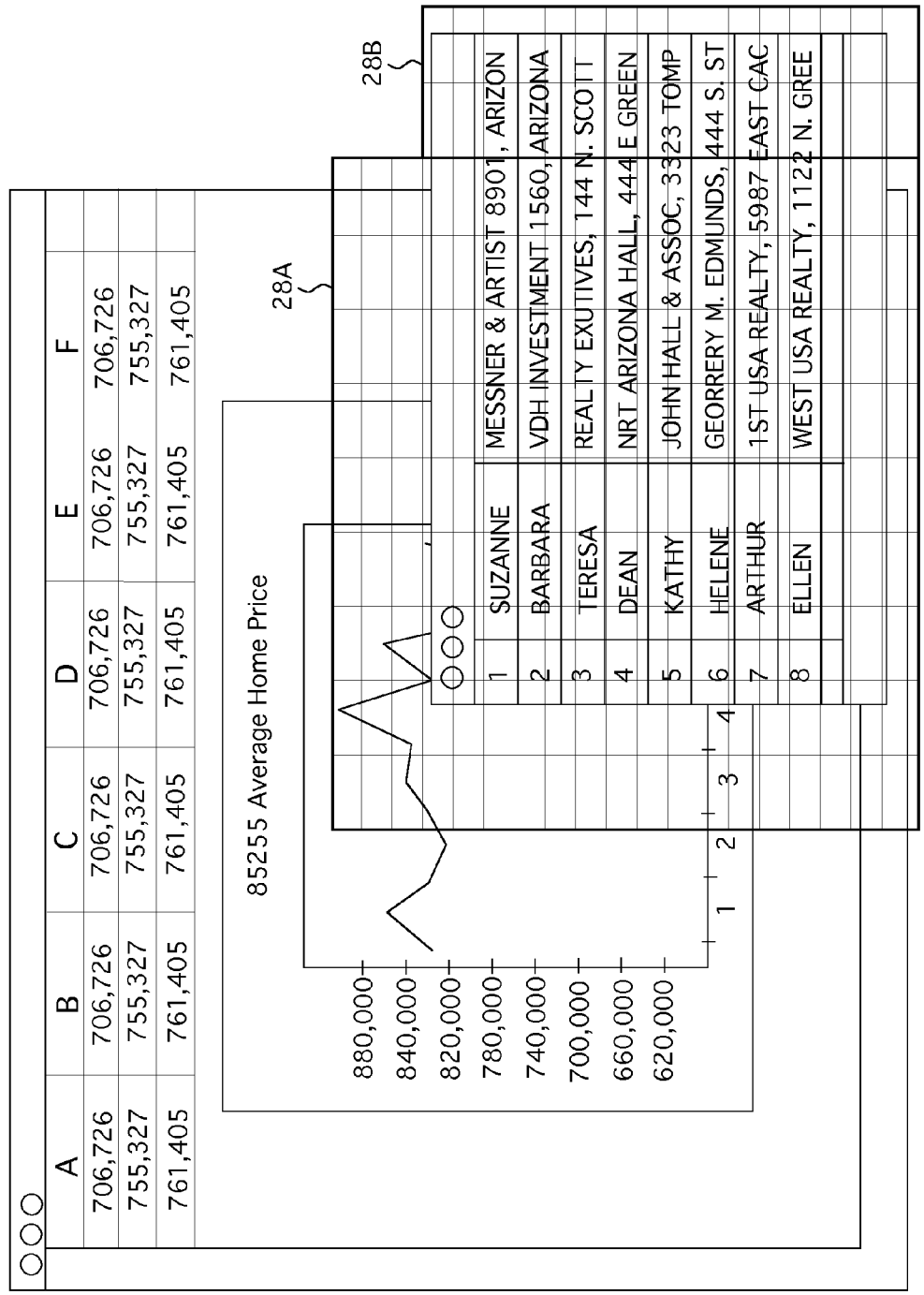
FIG. 4D illustrates an embodiment of the present invention wherein two macro blocks are generated and transmitted corresponding to two screen update images.

FIG. 4C illustrates an example wherein the newly opened window is moved at the presenter computer 22, and FIG. 4D illustrates two macro blocks 28A and 28B that are generated for two screen update images corresponding to the screen change at the presenter. Any suitable algorithm may be employed to identify the macro blocks, wherein the dimensions of each macro block (screen update image) is ultimately identified using suitable HTML tags, such as the position, left, top, width and height tags shown in the HTML code of FIG. 1B.

Figure 5:
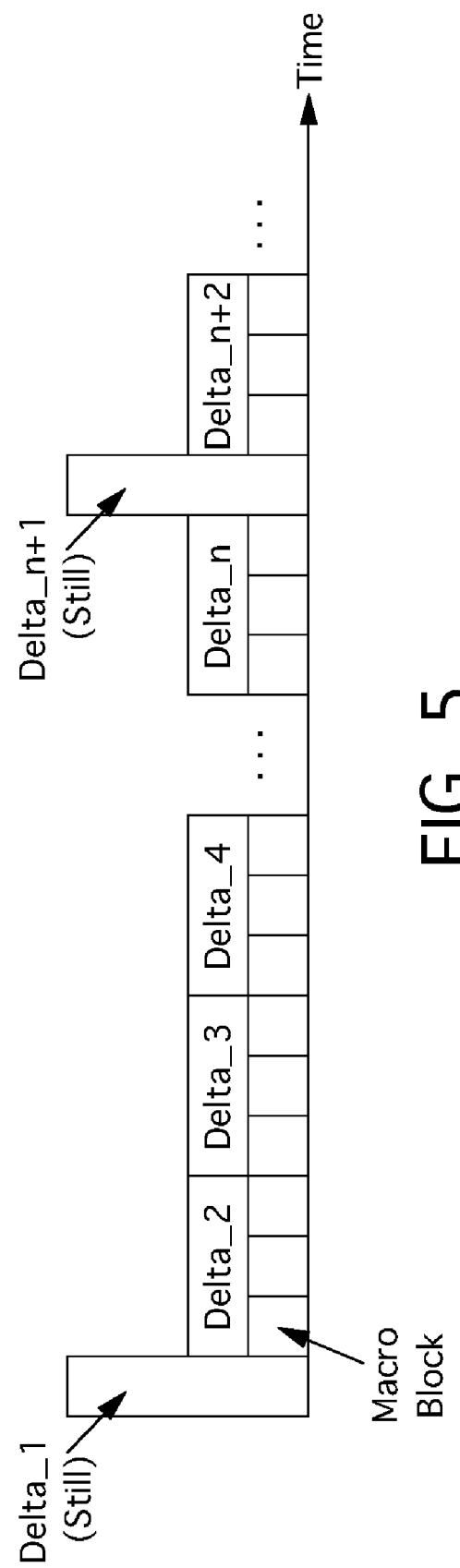
FIG. 5 shows an embodiment of the present invention wherein the macro blocks of a screen update are transmitted in a delta data packet, wherein a full screen update image (still) is transmitted periodically in order to synchronize the attendees.

FIG. 5 shows an embodiment of the present invention wherein the screen update images are transmitted to the attendee computers 24A-24C as delta data packets comprising one or more macro blocks. The first delta data packet (Delta_1) comprises a single macro block referred to as a "still" which represents a substantially full screen update image of the presenter's screen. The next delta data packet (Delta_2) comprises one or more macro blocks identifying the screen update images of the presenter's screen, the next delta data packet (Delta_3) comprising the next screen update images, and so on. In one embodiment, an attendee computer will receive a delta data packet comprising a "still" macro block representing a full screen update, and in one embodiment when the delta data packet comprising the "still" macro block is received by the server computer 20 from the presenter computer 22, all other pending delta's buffered by the server 20 are flushed and the delta comprising the "still" macro block transmitted to all of the attendee computers 24A-24C. In this manner, all of the attendee computers 24A-24C will be synchronized in that they will be displaying the same full screen image.

Figure 6A:
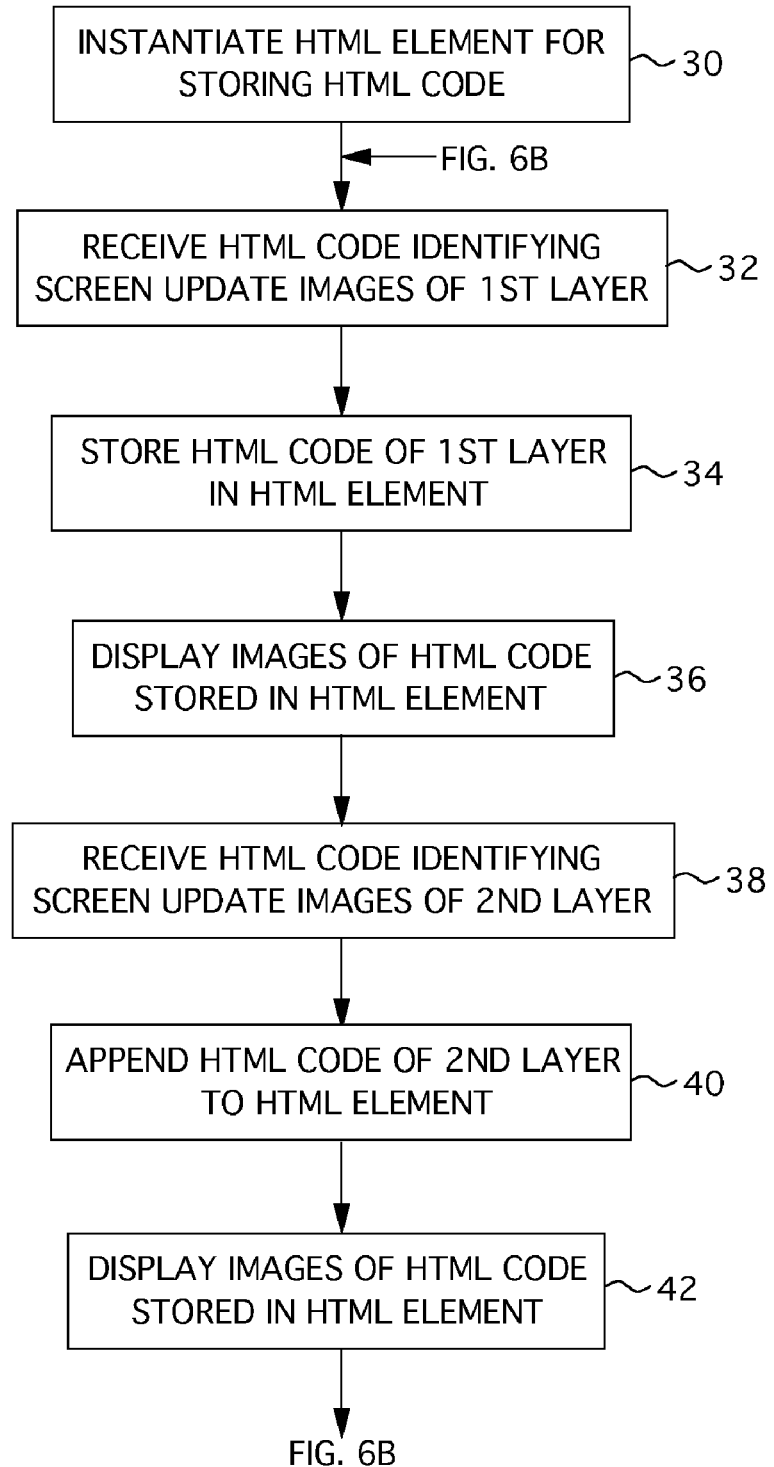
FIG. 6A is a flow diagram according to an embodiment of the present invention wherein the HTML code for displaying the screen update images is appended to an HTML element.

FIG. 6A is a flow diagram according to an embodiment of the present invention wherein the HTML code for identifying the screen update images is stored in an HTML element. The HTML element is instantiated by the browser (step 30), and when the browser receives the HTML code identifying the screen update images of a first layer (step 32), the HTML code is stored in the HTML element (step 34). The screen update images identified by the HTML code stored in the HTML element are then retrieved from the sever computer 20 and displayed at the attendee computer 24 (step 36). When the browser receives the HTML code identifying the screen update images of the second layer (step 38), the HTML code is appended to the HTML element (step 40). The screen update images identified by all of the HTML code stored in the HTML element are then displayed at the attendee computer 24 (step 42). In one embodiment, the previously displayed screen update images (e.g., for the first layer) are retrieved from a local cache at the attendee computer 24, whereas the new screen update images (e.g., for the second layer) are received over the network from the server computer 20.

The HTML code may be appended to the HTML element in any suitable manner. In one embodiment illustrated by the source code shown in FIGS. 11A-11D, the server computer 20 generates a suitable script (e.g., a JavaScript) which is transmitted to the browser at the attendee computer 24. When the browser executes the script (by executing the eval command within the function StateChanged( )), the browser appends the newly received HTML code to the HTML element.

Figure 6B:
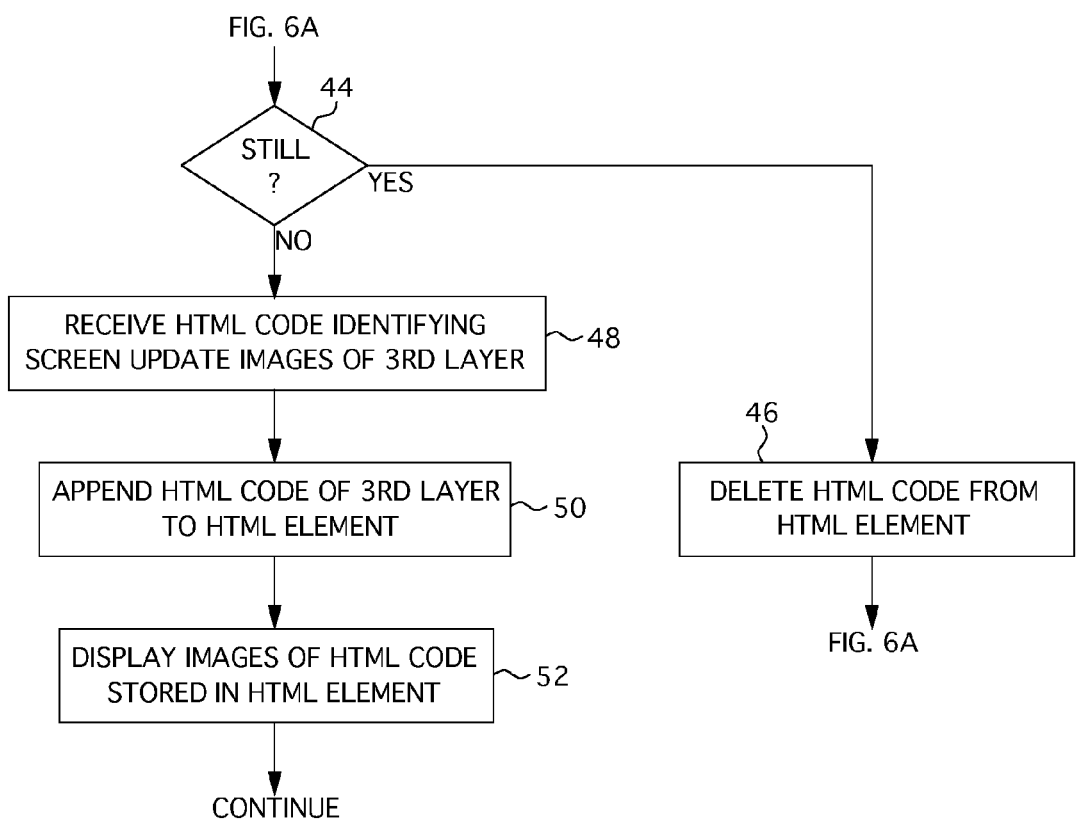
FIG. 6B is a flow diagram according to an embodiment of the present invention wherein the HTML code is deleted from the HTML element when a full screen update image (still) is received.

In an embodiment shown in FIG. 6B, when an attendee computer 24 receives a full screen update image (step 44), all of the current HTML code stored in the HTML element is deleted (step 46) and the flow diagram continues at step 32 of FIG. 6A. Otherwise, the HTML code identifying the screen update images of the next layer (e.g., $3^{rd}$ layer) are received (step 48), appended to the HTML element (step 50), and displayed (step 52) together with the previous screen update images identified by the previous HTML code for all other layers (displayed in ascending order). In one embodiment, a script (e.g., a JavaScript) is received over the network (as in the example source code shown in FIGS. 11A-11D) which causes the current HTML code stored in the HTML element to be deleted (step 46) and replaced by the HTML code identifying the full screen update image.

Figure 7:
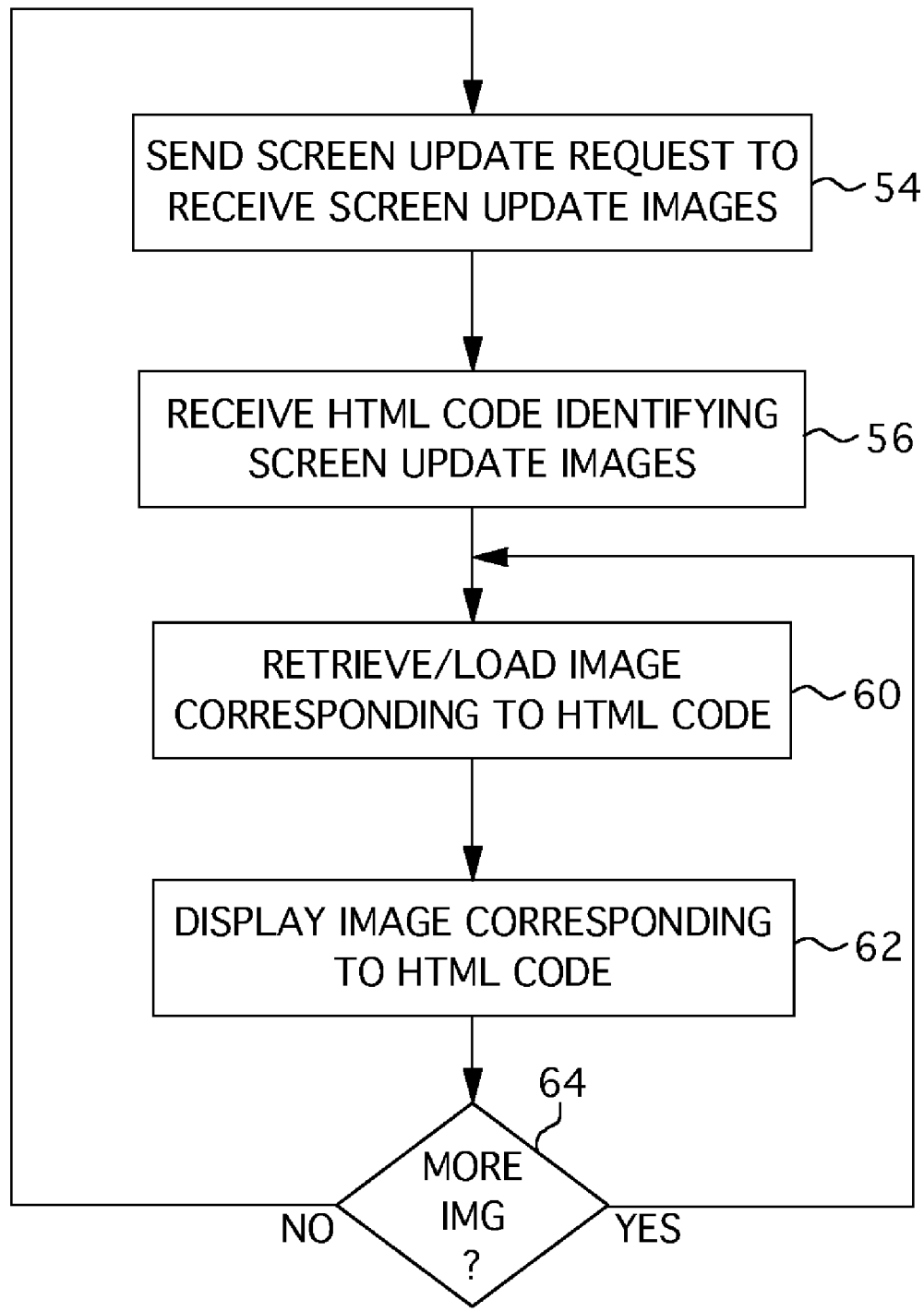
FIG. 7 is a flow diagram according to an embodiment of the present invention wherein all of the screen update images included in a delta data packet are displayed before transmitting a new update request.

In one embodiment, the browser at an attendee computer displays all of the screen update images for the current layers before sending a new update request over the network. This embodiment is illustrated in the flow diagram of FIG. 7 wherein after sending an update request over the network (step 54), the HTML code identifying the next screen update images is received over the network (step 56). The browser then executes the HTML code to retrieve the screen update image of the first layer, which may be retrieved from the local cache or loaded over the network (step 60). The screen update image is displayed on the attendee's screen (step 62), and if there are more screen update images to display (step 64), the flow diagram continues at step 60. Once all of the screen update images have been displayed, including the screen update images of the layer associated with the current update request, the browser sends a new update request to receive the HTML code identifying the next screen update images (step 54).

Figure 8:
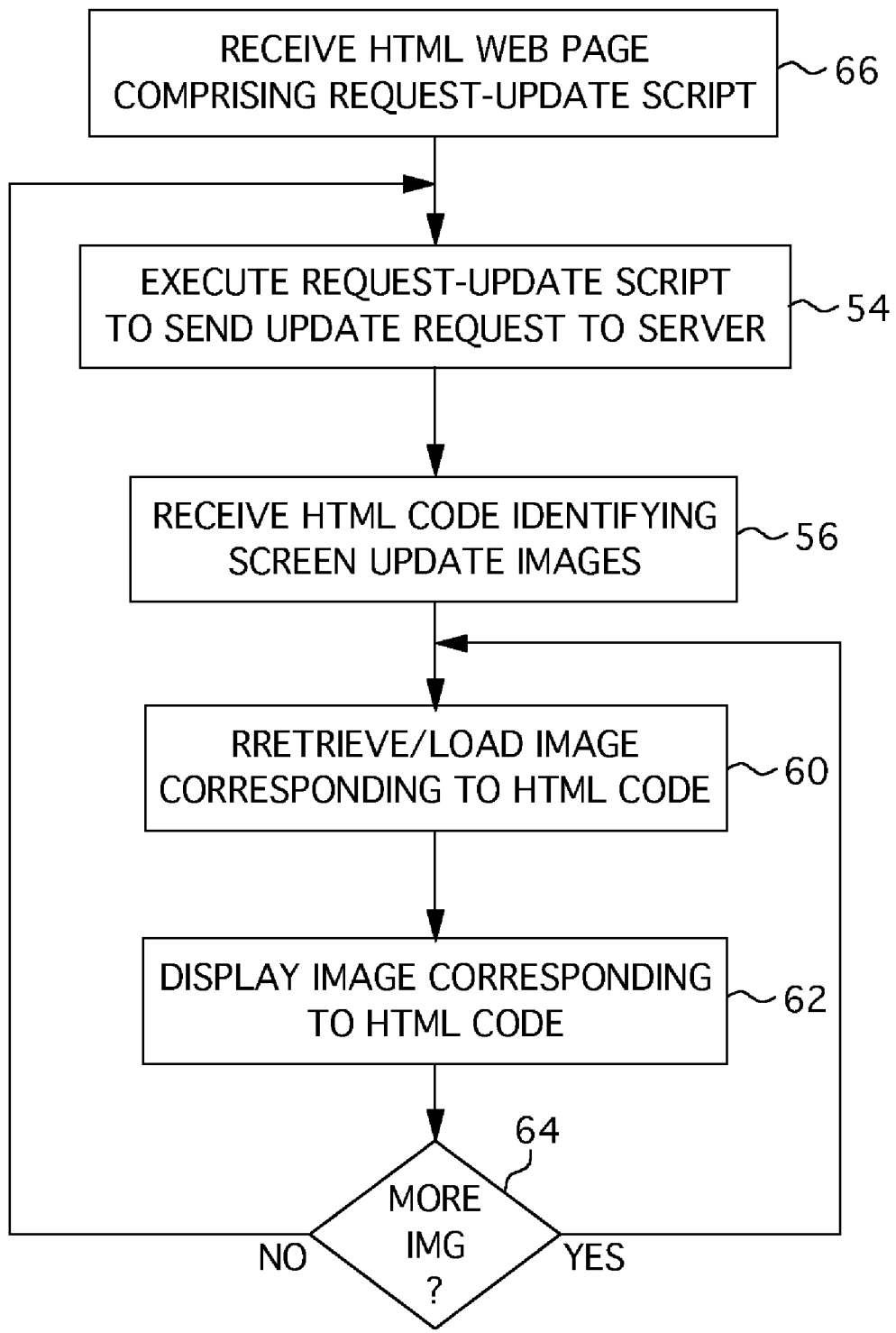
FIG. 8 is a flow diagram according to an embodiment of the present invention wherein an update request is executed by executing a request-update JavaScript.
Figure 9:
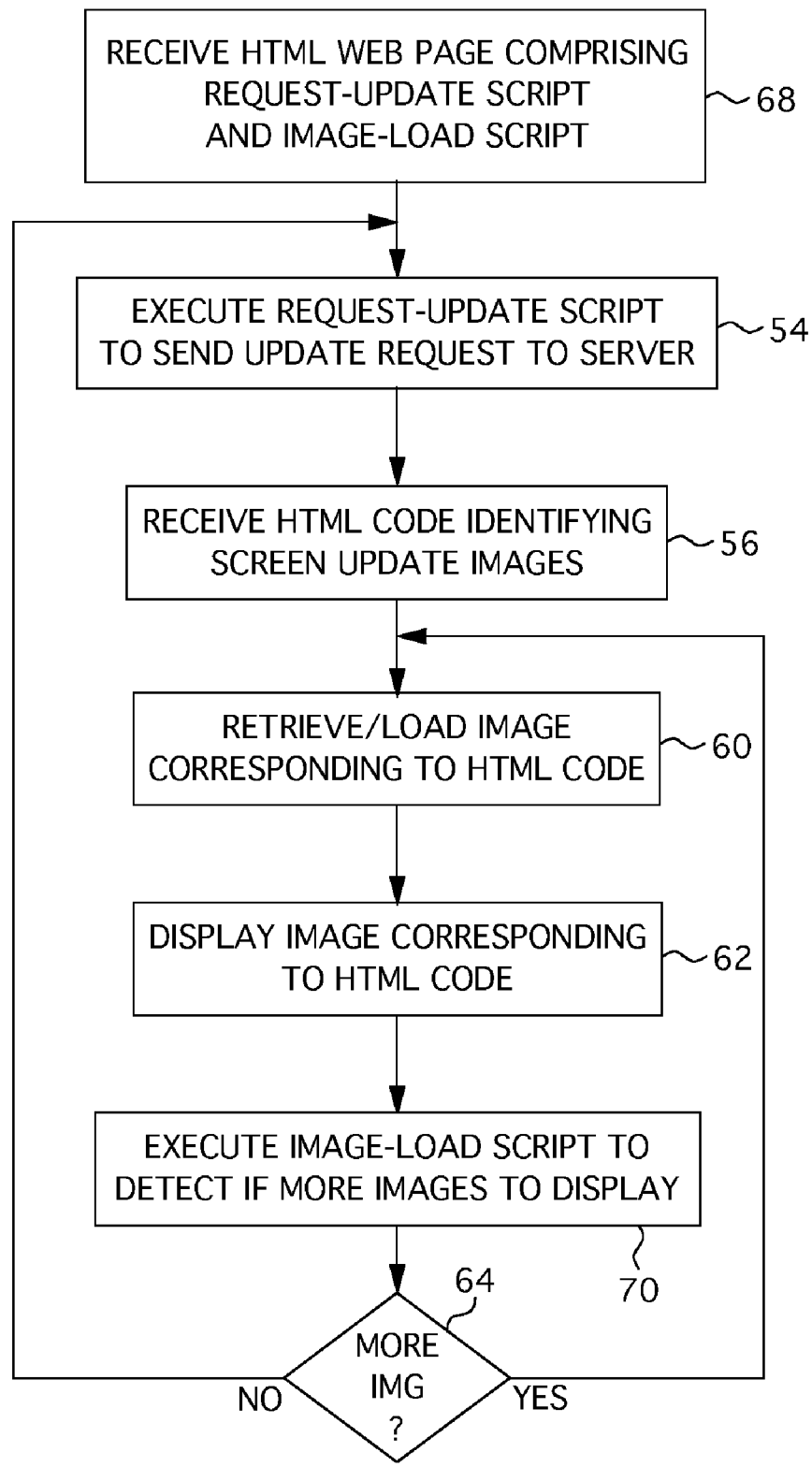
FIG. 9 is a flow diagram according to an embodiment of the present invention wherein an update request is executed by executing a request-update JavaScript from an image-load JavaScript after displaying all of the images in the current delta data packet.

Any suitable code may be employed to generate the update request at the attendee computer. In an embodiment shown in the flow diagram of FIG. 8, a script (e.g., a JavaScript) is received by the attendee computer within an HTML web page (step 66). An example script RquestUpdate( ) is shown in the source code of FIGS. 11A-11D which is called from the function Start( ) in the body section of the HTML web page as well as from the function ImageLoad( ). Similarly, any suitable code may be employed to wait for all of the screen update images to be displayed before sending a new update request. In an embodiment shown in the flow diagram of FIG. 9, a script (e.g., a JavaScript) is received by the attendee computer within an HTML web page (step 68). An example script ImageLoad( ) is shown in the source code of FIGS. 11A-11D which is called after a screen update image is loaded (received over the network at step 60). Referring to the example HTML code of FIG. 1B, the onload HTML tag causes the browser to call function ImageLoad( ) after a screen update image is loaded over the network (as opposed to retrieved from the local cache). After displaying all of the cached screen update images (step 62), the screen update images associated with the current update request are loaded over the network, and the ImageLoad( ) function executed after each screen update image is loaded (step 70). Once all of the new screen update images have been loaded and displayed, the ImageLoad( ) function calls the RquestUpdate( ) function to send a new update request over the network (step 54).

Figure 10:
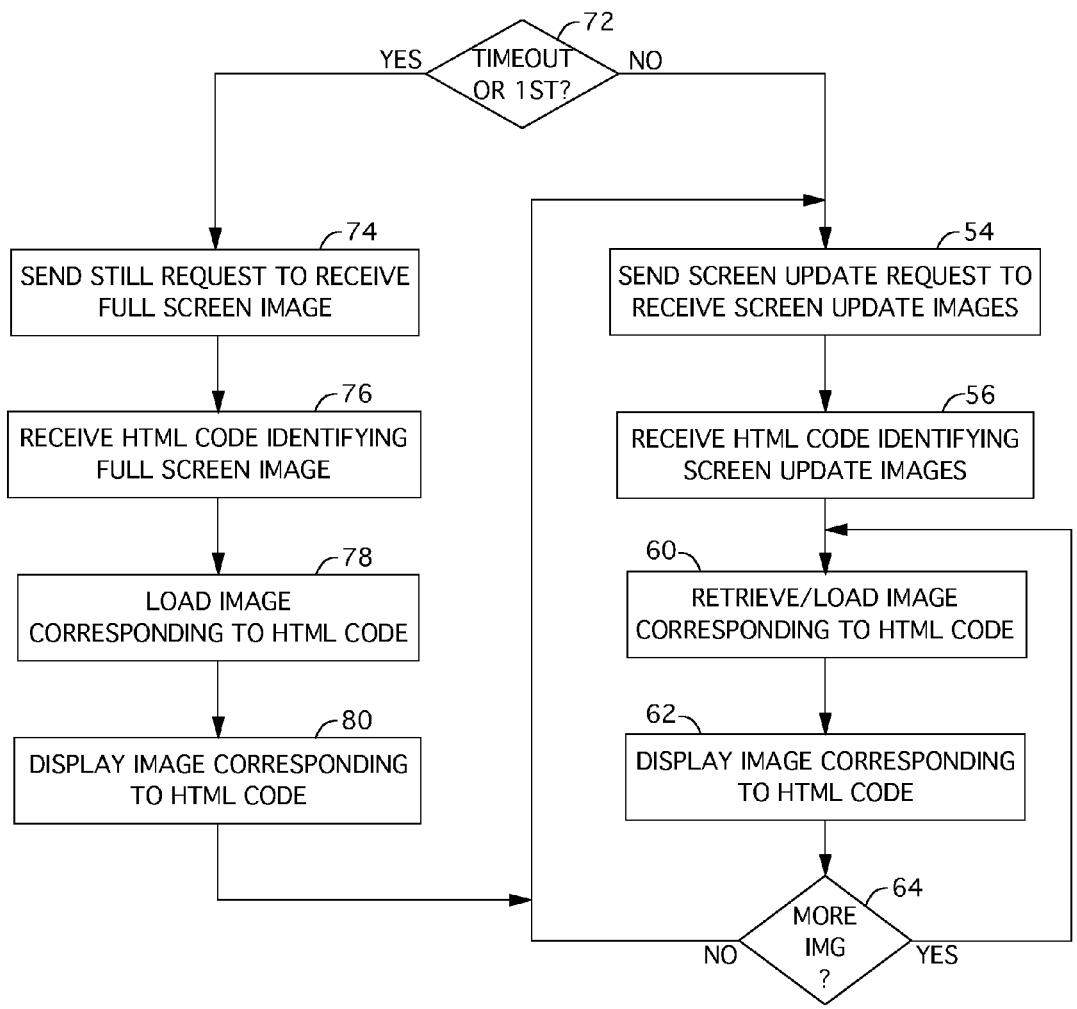
FIG. 10 is a flow diagram according to an embodiment of the present invention wherein a request for a full screen update image is transmitted when a communication error is detected.

FIG. 10 is a flow diagram according to another embodiment of the present invention wherein when a communication error is detected or when the update request is called the first time (step 72), the attendee computer sends a request for a full screen update image (step 74). The HTML code identifying the full screen update image is received over the network (step 76) and then executed to load the full screen update image over the network (step 78). After displaying the full screen update image (step 80), a new update request is sent over the network (step 54) and the process continues as described above. If a response is not received over the network (e.g., after sending a request to load a screen update image) over a period of time (timeout), a communication error is detected (step 72) and a new update request for a full screen update image is sent over the network (step 74).

Any suitable code may be employed to detect when to send an update request for a full screen update image in response to a communication error. In the source code of FIGS. 11A-11D, a variable gUpdatedInTimeout tracks whether a response has been received over the network. The variable gUpdatedInTimeout is initialized to zero in the Start( ) function, and the Start( ) function is scheduled to be executed at a predetermined interval (gTimeout). The variable gUpdatedInTimeout is set to one in the ImageLoad( ) function after receiving a screen update image over the network. If the ImageLoad( ) function is not called within the timeout interval, the Start( ) function will call the RquestUpdate( ) function with a timeout parameter set to true so that a request for a full screen update image is sent over the network.

Any suitable source code may be employed in the embodiments of the present invention. For example, alternative source code executed by the browser at each attendee computer is shown FIGS. 12A-12C, and alternative source code executed by the server computer is shown in FIG. 12D. In addition, the layers aspect of the present invention may be implemented in any suitable manner. In the embodiments described above, a z-index HTML tag is employed to simplify the display of images in the appropriate layers. However, the z-index HTML tag may not be necessary to implement the layers aspect. For example, the z-index HTML tag may not be necessary if the gMaxDiv constant of FIG. 12A is sufficiently large. In addition, future versions of browsers may not utilize a z-index HTML tag, or may use a different type of HTML tag.

Any suitable browser (e.g., Internet Explorer, Safari, Firefox, etc.) may be executed by the attendee computers 24A-24C in order to implement the various embodiments of the present invention. However, earlier versions of browsers may not include sufficient resources to implement all of the embodiments disclosed above. For example, the ability to display images in layers (e.g., using the z-index parameter) may not be supported by older browsers. However, most computers have been installed or updated with browsers having the capabilities to implement all of the above embodiments. Further, if an attendee computer has not yet been installed or updated with a newer browser, the concern of downloading a virus is ameliorated since installing or updating a browser typically involves downloading a trusted application.

What is claimed is:

1. A browser based web conferencing method, the method comprising transmitting Hypertext Markup Language (HTML) code to a browser of an attendee computer connected to a network, the HTML code comprising code segments for:
   transmitting over the network a first screen update request;
   receiving over the network HTML code identifying a screen update image of a first layer;
   transmitting over the network a request to receive the screen update image of the first layer;
   displaying the screen update image of the first layer at the attendee computer;
   transmitting over the network a second screen update request;
   receiving over the network HTML code identifying a screen update image of a second layer;
   transmitting over the network a request to receive the screen update image of the second layer; and
   receiving and displaying the screen update image of the second layer,
   wherein:
   the screen update image of the second layer overlaps at least part of the screen update image of the first layer;
   the code segment for receiving the HTML code of the first layer comprises a code segment for receiving HTML code identifying a plurality of screen update images of the first layer; and
   the code segment for transmitting over the network a request to receive the screen update image of the first layer comprises an image-load script executed by the attendee computer in connection with receiving one of the screen update images, wherein the image-load script executes a request-update script to cause the attendee computer to request a screen update image over the network in response to all of the screen update images of the first layer having been displayed at the attendee computer.

2. The method as recited in claim 1, wherein the HTML code comprises an img HTML tag.

3. The method as recited in claim 1, wherein the HTML code identifying the screen update image of the first layer comprises a first z-index HTML tag and the HTML code identifying the screen update image of the second layer comprises a second z-index HTML tag.

4. The method as recited in claim 1, wherein:
   the first update image of the first layer represents a substantially full screen update; and
   the second update image of the second layer represents a partial screen update.

5. The method as recited in claim 1, wherein the HTML code further comprises code segments for:
   storing the HTML code of the first layer in an HTML element; and
   appending the HTML code of the second layer to the HTML element.

6. The method as recited in claim 5, wherein the HTML code further comprises a code segment for deleting the HTML code from the HTML element when a full screen update image is received.

7. The method as recited in claim 1, wherein the HTML code further comprises code segments for:
   detecting a communication error by a timeout period when a browser has not received any images; and
   transmitting over the network a request for a full screen update image in response to the communication error.

8. A browser based web conferencing method comprising:
   an attendee computer transmitting over a network a first screen update request; the attendee computer receiving over the network Hypertext Markup Language (HTML) code identifying a screen update image of a first layer;

the attendee computer transmitting over the network a request to receive the screen update image of the first layer;

the attendee computer displaying the screen update image of the first layer;

the attendee computer transmitting over the network a second screen update request;

the attendee computer receiving over the network HTML code identifying a screen update image of a second layer;

the attendee computer transmitting over the network a request to receive the screen update image of the second layer; and the attendee computer displaying the screen update image of the second layer, wherein:

the screen update image of the second layer overlaps at least part of the screen update image of the first layer;

the HTML code of the first layer comprises a code segment for receiving HTML code identifying a plurality of screen update images of the first layer; and the attendee computer executes an image-load script in connection with receiving one of the screen update images, wherein the image-load script executes a request-update script to cause the attendee computer to request a screen update image over the network in response to all of the screen update images of the first layer having been displayed at the attendee computer.

9. A browser based web conferencing system comprising a server computer, a presenter computer, and an attendee computer, wherein the server computer is configured to receive screen update images from the presenter computer and transmit the screen update images to the attendee computer;

the attendee computer is configured to transmit to the server computer a first screen update request;

the attendee computer is configured to receive from the server computer Hypertext Markup Language (HTML) code identifying a screen update image of a first layer;

the attendee computer is configured to transmit to the server computer a request to receive the screen update image of the first layer;

the attendee computer is configured to display the screen update image of the first layer;

the attendee computer is configured to transmit to the server computer a second screen update request;

the attendee computer is configured to receive from the server computer HTML code identifying a screen update image of a second layer;

the attendee computer is configured to transmit to the server computer a request to receive the screen update image of the second layer; and the attendee computer is configured to display the screen update image of the second layer, wherein:

the screen update image of the second layer overlaps at least part of the screen update image of the first layer;

the HTML code of the first layer comprises a code segment for receiving HTML code identifying a plurality of screen update images of the first layer; and the attendee computer executes an image-load script in connection with receiving one of the screen update images, wherein the image-load script executes a request-update script to cause the attendee computer to request a screen update image from the server in response to all of the screen update images of the first layer having been displayed at the attendee computer.

* * * * *